Jan. 24, 1961 G. J. KELLEY 2,969,523

FLUX CONTROL SYSTEM FOR MULTI-LEGGED MAGNETIC CORES

Filed Jan. 22, 1957 2 Sheets-Sheet 1

INVENTOR:
GEORGE J. KELLEY,

BY Hugo M. Wikstrom
HIS ATTORNEY.

INVENTOR:
GEORGE J. KELLEY,
BY Hugo M. Wikstrom
HIS ATTORNEY.

2,969,523

FLUX CONTROL SYSTEM FOR MULTI-LEGGED MAGNETIC CORES

George Joseph Kelley, Utica, N.Y., assignor to General Electric Company, a corporation of New York Filed Jan. 22, 1957, Ser. No. 635,251

6 Claims. (Cl. 340—174)

This invention relates to the art of information storage and more particularly to the art of storing information in the form of magnetic flux in magnetic cores.

In recent years the increased utilization of binary codes in information handling equipments has resulted in great emphasis upon storage media for information coded in binary form. The prior art has developed several forms of magnetic storage elements which could be used for storing information in the form of changed magnetic states of a ferromagnetic element. In the usual case, for example, in the storage matrix well known to the art, a storage element has been of the form of the simple toroid of a ferromagnetic material characterized by a square hysterisis loop. The information stored in the storage matrix then takes the form of saturation of the core in one direction or the other around the toroid. "Read-out" of the stored information, or determination of the direction of magnetization (i.e. core setting) has been made with simple circuitry at the expense of destruction of the information stored.

In other storage elements of the prior art information has been stored in the form of varying degrees of saturation of a magnetic core. In these elements control of the magnetization force of the information-containing input to the device must be carefully controlled.

It is, therefore, one object of my invention to provide an improved information storage element and circuitry capable of storage and subsequent read-out without changing the storage state.

It is a further object of my invention to provide an improved information storage element and associated circuitry.

It is a further object of my invention to provide an improved information storage system.

It is a further object of my invention to provide a flux control system for multi-legged magnetic cores.

In accordance with these objects I have provided, in one embodiment of my invention, a unitary toroidal core composed of two portions; one portion is composed of hard ferrite material having a hole therethrough to provide a first and second parallel path of the core flux, and the second portion is constructed of a soft ferrite material, similarly having an opening therethrough to provide third and fourth parallel paths for the core flux. Output signal windings are magnetically coupled by material in the third and fourth paths in the soft ferrite section. When it is desirable to indicate that a first information signal has been stored on the core, the soft ferrite section is completely saturated with flux, thereby decoupling the signal windings on said third and fourth path. When it is desirable to indicate the storage of a second information signal, the soft ferrite section is maintained with no residual flux, thereby providing close coupling between the signal winding. In order to control the flux density in the soft ferrite section, the first parallel path in the hard ferrite portion of the core is maintained at saturation flux density by a biasing winding and an information signal winding is wound on the second parallel path. The information signal winding is energized by the information signal to magnetize the path to saturation in one direction in response to the first signal and in the section direction in response to the second signal. In response to the first signal, the core flux in the first path, the bias path, and the second path, the signal path, are in the same direction, add together in the remainder of the core, and therefore, saturate the soft ferrite portion of the core. In response to a second signal the magnetization of the signal path is reversed. Therefore, the biasing flux travels around paths 1 and 2 and the remainder of the core is restored to the condition of zero net flux. In this manner I provide method and means for changing the coupling between two signal windings from the coupling of an iron core transformer to that of air. This is accomplished through the changing of direction of flux saturation in another portion of the core which can be easily done without accurate control of the magnetomotive forces applied by the signal windings. It should be noted, of course, that this coupling between the signal windings can be effectively 100% coupling or 0% coupling by suitably arranging the output signal windings.

The features of my invention which I believe to be novel are set forth with particularity in the appended claims. My invention, itself, however, together with further objects and advantgaes thereof, may best be understood by reference to the following description taken in connection with the accompanying drawings, in which:

Figure 1:
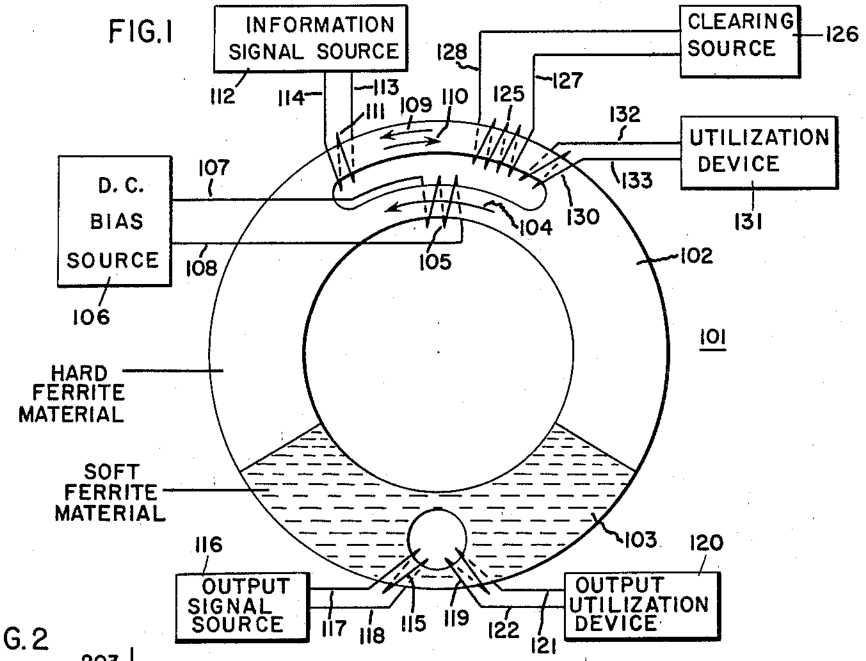
Figure 1 is a schematic view of an element and associated circuitry utilizing the flux control system of my invention.

In Figure 1 there is shown a ferromagnetic core 101 having a section of hard ferrite 102 and a section of soft ferrite 103. The hard ferrite section has as desirable characteristics a high saturation flux density, a high residual flux density and a low coercive force. This material preferably has a substantially rectangular hysterisis curve. The soft ferrite material 103 is preferably made of material having as close to a linear hysteresis loop as possible, for reasons which will be explained in subsequent portions of the specification.

The hard ferrite core portion is divided into two paths by an aperture or hole passing therethrough. One path, the bias path, is maintained permanently at a saturation level in the direction shown by arrow 104 by winding 105 which receives power from a D.C. source 106 over leads 107 and 108. The saturation flux may also be maintained by a permanent magnet in proximity to the path. The other parallel path in the hard ferrite portion of the core, the signal path, is selectably saturated in the direction of arrow 109 or 110 by the action of the magnetomotive force of coil 111 supplied with power from an information signal source 112 over leads 113 and 14. This information signal source can be any conventional signal source for binary-coded operation such as a source having a positive going voltage representative of the digit 1 and a negative going voltage representative of the digit 0.

Similarly the soft ferrite portion is divided into two parallel paths by an aperture. An output signal winding 115 surrounds one of these paths and is supplied with power from an output signal source 116 over leads 117 and 118. Associated with the same magnetic path is an output winding 119 which applies voltages induced in it to the utilization device 120 over leads 121 and 122.

When the information signal stored on the element 101 induces flux in the direction of arrow 109 (the same direction as the biasing flux), the fluxes will add through the remainder of the core element 101 and, by properly apportioning the respective areas of the magnetic paths, will saturate the paths linking windings 115 and 119. On the other hand, when the applied information signal causes flux saturation in the direction shown by arrow 110, proper proportioning of the respective areas of the paths in the hard ferrite portion of the core will cause the biasing flux to circulate around the shorter magnetic path through the signal storage path. In this event, no net flux will exist in the remainder of the core.

It will be recognized by those skilled in the art that ferrite material presently available causes no difficulty in properly apportioning the respective areas of the parallel paths in the hard ferrite section of the core since the residual flux density and the saturation flux density are approximately equal. Thus, the condition can be met in practice by making the parallel paths in the portion 102 of equal cross sectional area.

The total cross sectional area of the paths in portion 103 should be proportioned with respect to the total cross sectional area of the paths in section 102 so that the establishment of flux saturation in the same direction in portion 102 (e.g. in direction of arrows 104 and 109) will cause saturation of the paths in portion 103. The relationship of the relative cross sectional areas will depend upon the permeability of the materials forming portions 102 and 103. In order to allow freedom of output signal strength without interference from leakage into portion 102, the paths in portion 103 should be of equal cross sectional area.

The output signal source 116 can be a source of A.C. signals or in some embodiments, be a source of pulse signals, dependent upon the requirements imposed by the utilization device. Since the coupling between the signal coil 115 and the output coil 119 is dependent upon the flux conditions of the coupling path, determination of the signal stored in the element can be obtained without destruction of the information stored by applying signals from source 116 to the winding 115. Since the information is stored in the form of bits 0 and 1, which result in flux saturation of the parallel path in one direction 109 or the other 110, determination of the storage of the appropriate bit can be made by the measurement of the output signal derived by coil 119. In the presence of no net flux coils 115 and 119 will, of course, be coupled in the efficient manner of an iron core transformer and an output signal will be applied to the uitlization device 120.

On the other hand, if the storage signal results in saturation of the coupling path, the only coupling between coils 115 and 119 will be that of the remnant coupling and the saturated characteristics of the core. It will be apparent to those skilled in the art that this coupling is sufficiently small that the output will be negligible. With present core material and windings applied by normal techniques, the output can be maintained at approximately 1% of the full coupled output. Circuit arrangements for reducing the remnant coupling even further in those applications where desirable will be apparent to those skilled in the art. For example, if the cores are uniform, a small amplitude, bias signal of opposite phase can be applied. Also bucking windings from auxiliary core and amplitude discriminator circuits may be employed.

The construction of this core is more feasible when formed and fuzed from powder having the desired characteristics. Materials for this construction are known in the art. It will be noted by those skilled in the art that the described flux control system would operate properly with a core composed entirely of hard ferrite material. However, many applications require the use of sinusoidal signals for operation of the utilization device 120. To prevent distortion, the soft ferrite portion is employed. When distortion is tolerable, the entire core may be composed of hard ferrite material. With such construction wound toroids of material know in the art may be employed.

It will also be apparent to those skilled in the art that signal source 112 can be separated into several independent sources with associated windings dependent upon the particular application to which the element is directed. For example, in some applications the binary bit 1 is represented by a positive voltage and the binary bit 0 is represented by zero voltage. For application to an information signal source employing such a coded representation, the core is initially set with a known flux path setting. For this purpose winding 125 is energized from a clearing source 126 over leads 127 and 128 to initially set that path, for example, in the direction of arrow 109. In this case the winding 111 is so phased with respect to the polarity of source 112 that the application of a positive voltage, representing the binary bit 1, causes flux saturation in the direction of arrow 110. The absence of voltage, representing the binary bit 0, causes no change in the initial setting of the signal flux path. Readout can be made to the output device 120 as specified above. After the information handling has been completed, the clearing source 126 applies voltage to return the signal flux path to its initial setting. At this time an adidtional output may be derived from the core by providing winding 130 which will feed an induced voltage only on flux reversal in the signal path to a utilization device 131 over leads 132 and 133.

Figure 2:
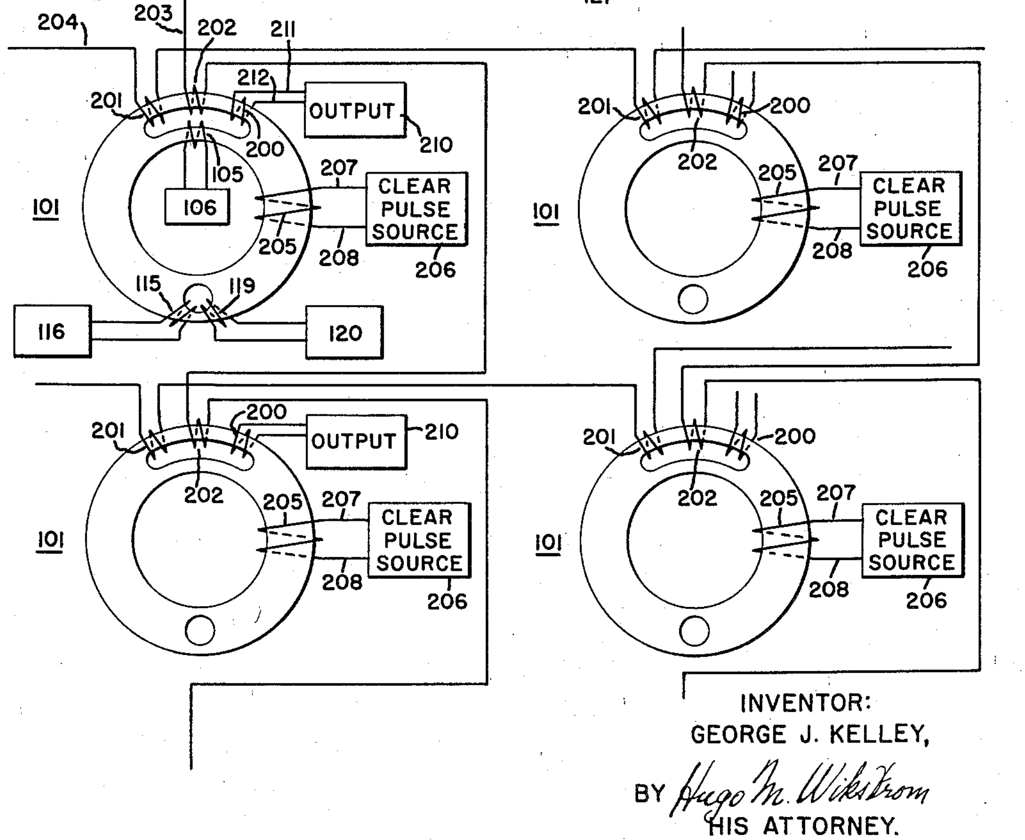
Figure 2 is a schematic diagram of a storage matrix employing the element of Figure 1.

It will also be apparent to those skilled in the art that the signal source 112 may in some applications be representative of a plurality of separate signal sources feeding individual windings so phased as to be additive with respect to the magneomotive force produced by the separate windings. Such an embodiment is most useful when the storage element is employed in a storage matrix. An example of this element in a portion of storage matrix is shown in Figure 2. In Figure 2 there is shown a plurality of elements 101 arranged in grid fashion. Each core is similar to that shown in Figure 1, having, for example, windings coupled by a magnetic path controlled by the flux setting of the core. These windings 115 and 119, are respectively associated with the signal source 116 and an output utilization device 120. A biasing winding 105, powered by source 106, sets the bias magnetic path in a fixed direction. Associated with the signal flux path are signal information coils 201 and 202. The windings in one column are serially connected by lead 203. The windings in one row are serially connected by lead 204. Information signals are fed over leads 203 and 204 in the conventional manner of timed signal application well known to the art. The windings associated with the signals applied to each row and column are proportioned with respect to signal strength so that the magnetomotive force exerted by the application of a signal in a single row or column is insufficient to overcome the residual flux density in the associated magnetic path to reverse the flux setting of that path. However, if a signal reaches a core element at the same time from both the row and the column connections, the combined magnetomotive force caused by the additive phasing of the windings is sufficient to overcome the residual flux density in the associated path, thereby reversing the setting of this path.

It will be recognized by those skilled in the art that the majority of storage matrices utilize a coding where the binary bit 1 is represented by a positive voltage and the binary bit 0 is represented by a zero voltage. For this reason, as explained in connection with Figure 1, it is desirable to employ a clearing winding which may be associated with the signal flux path as shown in Figure 1, or alternately may be associated with the central portion of the core structure as shown in Figure 2. Such an embodiment is represented in Figure 2 by the winding 205 which is powered from a clearing pulse source 206 over leads 207 and 208.

In this embodiment I have provided means for deriving information from the matrix concerning the flux setting of the individual cores without disturbing the flux setting. This means is provided by the windings 115 and 119, the coupling therebetween being dependent upon the setting of the core. I have also supplied means for reading out the information in conventional fashion by coil 200 which will generate an output pulse only on flux reversal in the signal path. Resetting the signal path flux can be effected either by application of a clearing pulse for parallel read-out, or by energizing the row and column windings with a pulse equal to the signal pulse but reversed in polarity for sequential read-out. Both types of read-out are known to the art.

Figure 3:
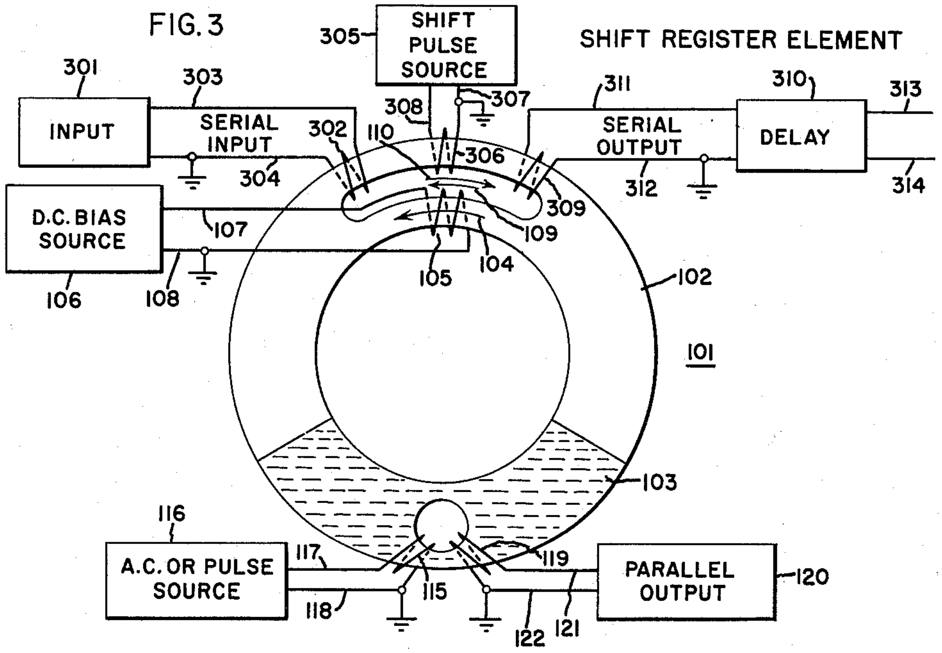
Figure 3 is a schematic diagram of a shift register circuit embodying my invention.

The flexibility of this element in controlling signal storage by control of the flux saturation of paths in magnetic core has application to an improved shift register, shown in Figure 3.

In Figure 3 there is shown one element arranged in the shift register circuit. The element 101 is similar to that shown in Figure 1 with a biasing winding 105 supplied with power from source 106 to maintain saturation of the biasing path in the direction shown by arrow 104. The saturation of the various paths can be determined by application of a signal to winding 115 coupled by one of these paths to winding 119.

One of the more common forms of input signals to a shift register consists of positive voltages representing the binary bit 1 and the absence of voltage indicating the binary bit 0. In order to store the binary bit 0, I initially set the signal flux path in the direction shown by arrow 109. This setting will be undisturbed by the applied bit 0 since no magnetomotive force is generated by coil 302. However, when a positive voltage is applied by the input signal source 301 to winding 302 over connection 303 and 304, magnetomotive force sufficient to overcome the residual flux in the signal flux path and cause reversal of the setting of that path as indicated by arrow 110 will be generated. When it is desired to transfer the information stored on this element to a subsequent element, a shift pulse is applied by source 305 to winding 306 over leads 307 and 308. This winding is so phased with respect to the polarity of the source of the shift pulse that it will cause flux reversal and resetting of the signal flux path in the direction shown by arrow 109. If the binary bit 0 had initially ben applied, no flux reversal of the signal flux path would occur with application of the shift pulse. Therefore, no output voltage will be induced in winding 309, applied to the delay line 310 over leads 311 and 312, and therefore, applied to the next element in the shift register over leads 313, 314. If, however, the binary bit 1 had been stored on the first element of the shift register, application of the shift pulse will cause flux reversal which will induce a voltage in winding 309. This voltage will be applied through the delay line 310 to the next element in the shift register. This voltage is applied to a similar element to store the voltage in the form of signal path setting.

A serial output is derived from a plurality of elements by continuous application of shift register pulses to shift the input signals along the register to an output utilization device. Derivation of a serial output from the shift register is quite similar to the shift register circuits used with solid toroidal cores well known in the prior art. With the flux control element shown in Figure 1, however, it is also possible to derive a parallel output at any stage of storage of information on the shift register by application of A.C. or pulses to winding 115. A corresponding voltage will be induced in winding 119 dependent upon the signal storage in that particular element. This output induced voltage can be applied to a parallel output utilization device 120. In this manner utilization of my flux control system of multi-leg magnetic cores provides increased flexibility in reading out stored information without destruction of the information and at the same time provides a method and means for destructive read-out as is known to the prior art.

It is also apparent that the flexibility of this flux control system from multi-leg magnetic cores is applicable to other information handling systems. An example of its use in a simple logic circuit is shown in Figure 4.

Figure 4:
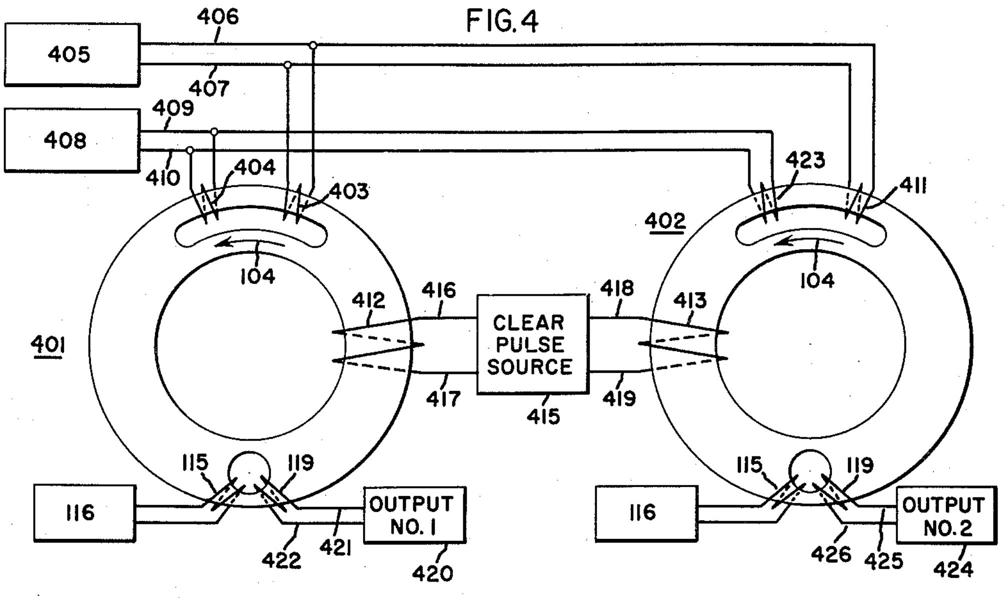
Figure 4 is a schematic diagram of a logic circuit embodying my invention.

In Figure 4 there are shown two elements, core elements 401 and core elements 402, which are similar to that shown in Figure 1 and in which similar parts are identically numbered. On element 401 two coils, 403 and 404, are wound with opposing senses. Coil 403 is powered from source 405 over leads 406 and 407. Coil 404 is powered from source 408 over leads 409 and 410. On core 402 coils 411 and 423 are wound with aiding senses. Coil 411 is energized by source 405 over leads 406 and 407. Coil 423 is energized by source 408 over leads 409 and 410. Elements 401 and 402 are initially set by clearing windings 412 and 413 respectively which are energized by a common source 415 over connections 416, 417, 418 and 419. Bias flux saturation in the direction of arrows is established in the same manner as explained in connection with Figure 1.

Both elements have read-out coils, element 401 being provided with a signal source 116 energizing winding 115 which is coupled through the path of the element to winding 119. Induced voltage in winding 119 is applied to output device 420 over leads 421 and 422. Similarly element 402 is provided with a signal source 116 and supplies power to a winding 115. Induced voltage in winding 119 is supplied to output device 424 over leads 425 and 426.

In operation of the circuit as a logic circuit, windings 403, 411 and 423 are so phased as to cause flux reversal of the signal flux path upon application of a signal. Winding 404 is so phased as to buck magnetomotive force induced by coil 403. The source 408 is adjusted so that the magnetomotive force induced in coil 404 is equivalent to that induced in coil 403 by source 405.

With these connections, a signal from source 405 alone will cause an output signal to be applied to output devices 420 and 424. If source 408 alone applies a signal, output 424 alone will receive a signal. If both sources apply signals, only output 424 will receive full signal. Many variations on the interconnections for other logic operations will be apparent to those skilled in the art.

While particular embodiments of the present invention have been shown and described, it will be obvious to those skilled in the art that changes and modifications may be made without departing from the invention in its broader aspects, and, therefore, the aim in the appended claims is to cover all such changes and modifications that fall within the true spirit and scope of the invention.

What I claim as new and desire to secure by Letters Patent of the United States:

1. In combination, a unitary ferromagnetic core having a first aperture therethrough providing a first and second parallel path and a second aperture therethrough providing a third and fourth parallel path, means for setting the core to an initial state of magnetization comprising biasing means for setting said first path in a first direction and clearing means for setting said second path in the same direction as said first path, signal responsive means for reversing the direction of magnetization of said second path, and means for determining the direction of magnetization of said second path.

2. In combination, a unitary ferromagnetic core having a first aperture therethrough providing a first and second parallel path and a second aperture therethrough providing a third and fourth parallel path, means for setting the core to an initial state of magnetization comprising biasing means for setting said first path in a first direction and clearing means for setting said second path in the same direction as said first path, means responsive to a signal for reversing the direction of magnetization of said second path, and means for determining the direction of magnetization of said second path, said last named means comprising a primary and secondary winding coupled by said third and fourth paths, a signal source coupled to said primary, and an output device coupled to said secondary.

3. In combination, a unitary ferromagnetic core having a first aperture therethrough providing a first and second parallel path and a second aperture therethrough providing a third and fourth parallel path, means for setting the core to an initial state of magnetization comprising biasing means for setting said first path in a first direction and clearing means for setting said second path in the same direction as said first path, means responsive to a signal for reversing the direction of magnetization of said second path, and means for determining the direction of magnetization of said second path, said last named means comprising an output winding surrounding said second path.

4. In combination, a unitary ferromagnetic core having a first aperture therethrough providing a first and second parallel path and a second aperture therethrough providing a third and fourth parallel path, biasing means for setting said first path in a first direction, and means for storing binary information on said core comprising means for setting said second path in the same direction as said first path in response to a first signal and means for setting said second path in the opposite direction in response to a second signal, means for determining the setting of said second path comprising a primary and a secondary winding surrounding said third path, a signal source coupled to said primary, and an output device coupled to said secondary, and means for transferring said stored signals comprising independent winding means for setting said second path in the same direction as said first path setting, a winding surrounding said second path and an output device coupled to said winding.

5. In combination, a unitary ferromagnetic core having a first and second portion, said first portion composed of hard ferromagnetic material having an aperture therethrough providing a first and second parallel path for the core flux, said second portion composed of soft ferromagnetic material having an aperture therethrough providing a third and fourth parallel path for the core flux, biasing means for setting said first path in a first direction, means for establishing saturation flux density in said third and fourth paths comprising clearing means for setting said second path in a first direction, signal responsive means for reversing the direction of magnetization of said second path, and means for generating a signal determination of the direction of magnetization of said second path.

6. In combination, a unitary toroidal magnetic core having a first aperture therethrough providing a signal and bias path for core flux and a second aperture therethrough providing a signal coupling path, means for setting said bias path in an initial direction, means for setting said signal path in an initial direction, signal responsive means for reversing said setting of said signal path, a signal source, a first winding surrounding said signal coupling path, mean coupling said signal source to said first winding, a second winding surrounding said signal path, an output device, means coupling said second winding to said output device.

References Cited in the file of this patent

UNITED STATES PATENTS

| | | |
|---|---|---|
| 2,741,757 | Devol et al. | Apr. 10, 1956 |
| 2,803,812 | Rajchman et al. | Aug. 20, 1957 |
| 2,810,901 | Crane | Oct. 22, 1957 |
| 2,811,710 | Demer | Oct. 29, 1957 |
| 2,818,555 | Lo | Dec. 31, 1957 |
| 2,869,112 | Hunter | Jan. 13, 1959 |